United States Patent [19]

Akiyama et al.

[11] 4,260,572

[45] Apr. 7, 1981

[54] PROCESS FOR PRODUCING FOAMED POLYSTYRENE BOARDS

[75] Inventors: Hiroyuki Akiyama, Hiratsuka; Nobuyoshi Shimoyashiki, Isehara; Hideo Hatakeyama, Hiratsuka; Toru Yamamoto, Kanuma, all of Japan

[73] Assignee: Japan Styrene Paper Corporation, Tokyo, Japan

[21] Appl. No.: 40,086

[22] Filed: May 17, 1979

[30] Foreign Application Priority Data

Mar. 9, 1979 [JP] Japan ................................. 54/26730

[51] Int. Cl.³ ............................................ B29D 27/00
[52] U.S. Cl. ..................... 264/53; 264/211; 264/DIG. 5
[58] Field of Search .................... 264/53, 211, DIG. 5

[56] References Cited

U.S. PATENT DOCUMENTS

| 2,384,521 | 9/1945 | Andersen et al. .................... 264/211 |
| 3,121,130 | 2/1964 | Wiley et al. ..................... 264/211 X |
| 3,151,192 | 9/1964 | Jacobs et al. ........................... 264/53 |
| 3,223,664 | 12/1965 | Conlon .............................. 264/211 X |
| 3,751,377 | 8/1973 | Buckner ............................. 264/53 X |
| 3,956,203 | 5/1976 | Burger et al. ..................... 264/211 X |
| 4,075,265 | 2/1978 | McClung et al. ................ 264/211 X |
| 4,136,142 | 1/1979 | Hargreaves et al. ............ 264/211 X |

*Primary Examiner*—Philip Anderson
*Attorney, Agent, or Firm*—Wenderoth, Lind & Ponack

[57] ABSTRACT

A foamed polystyrene board useful as a thermal insulating material is produced by melting a polystyrene having a melt index of from 0.5 to 5 under heat in an extruder, mixing the molten mass with a blowing agent composed of methyl chloride and dichlorodifluoromethane, and extruding the resulting foamable molten gel from the extruder. As a novel essential feature, a flowability improver having a melting point higher than 70° C., such as an aromatic sulfonamide, a brominated aromatic compound, a brominated alicyclic compound or a poly($\alpha$-methylstyrene), is mixed with the polystyrene within the extruder to impart superior extrusion formability. The foam has good dimensional stability both at room temperature and higher temperature, high mechanical strength and superior thermal insulation properties.

8 Claims, No Drawings

PROCESS FOR PRODUCING FOAMED POLYSTYRENE BOARDS

BACKGROUND OF THE INVENTION

1. Field of the Invention

This invention relates to a process for producing a foamed polystyrene board. More particularly, the invention relates to a process for producing a foamed polystyrene board having good dimensional stability, high mechanical strength and superior thermal insulation properties.

2. Description of the Prior Art

Foamed polystyrene boards have previously been used widely as thermal insulating material.

In the production of relatively thick foamed polystyrene boards by extrusion, the foam immediately after extrusion from a die orifice is passed through a forming device called a guider to form it into a board of a definite shape. The extrusion formability of the polystyrene greatly affects the operation of the extruder or the quality of the resulting foam. For the production of thick foamed polystyrene board by extrusion, therefore, it is the usual practice to employ polystyrene having much higher flowability than those used generally in the production of thin sheet-like polystyrene foams, for example polystyrene having a melt index, measured by the method described in ASTM D-1238G, of at least about 8.

These polystyrenes having such a high melt index may have improved extrusion-processability, but the resulting foams will have low mechanical strength and inferior dimensional stability.

The foams are generally cut to the desired size, and then shaved to obtain final products. Products having poor dimensional stability would require re-processing or would be useless as insulating material, because variations in dimension occur with the lapse of time. When actual applications are considered, these products should desirably have good dimensional stability not only at room temperatures but at higher temperatures of, say, 70° C. However, conventional foams obtained by using polystyrene having a high melt index do not possess enough dimensional stability to make them useful at higher temperatures.

It is well known to those skilled in the art that the thermal insulating properties of foamed polystyrene are greatly affected by the type and amount of the blowing agent used. For example, Japanese Laid-Open Patent Publication No. 94366/77 discloses a process for producing a foamed polystyrene having superior thermal insulating properties by using a specified type of blowing agent in a specified amount. The foamed products obtained by this process have insufficient dimensional stability, and their thermal insulating properties are not entirely satisfactory. Many additional patents and other documents have been published on the production of foamed polystyrene by an extruding technique. However, the foamed products obtained by the methods disclosed in these documents have their advantages and disadvantages, and none of them exhibit good extrusion formability and a well-balanced combination of the properties required of thermal insulating materials.

SUMMARY OF THE INVENTION

We have extensively worked on a method which would afford foamed polystyrene board having a well-balanced combination of superior thermal insulation properties, mechanical strength and dimensional stability by extrusion. Our work has finally led to the discovery that a foamed polystyrene board having the aforesaid properties can be produced easily with good extrusion formability if we use a polystyrene having a high melt viscosity expressed by a specified melt index, which polystyrene has not been used in the past because of its poor extrusion processability, and mix it with a flowability improver having a melting point of more than 70° C. and a blowing agent composed of methyl chloride and dichlorodifluoromethane.

It is an object of this invention therefore to provide a foamed polystyrene board having superior mechanical strength, dimensional stability and thermal insulation properties.

Another object of this invention is to provide a process for producing a foamed polystyrene board having the aforesaid superior properties as thermal insulating materials from a polystyrene having a low melt index which has not generally been used because of its poor processability in an extrusion process.

Still another object of this invention is to provide a process for easily producing a foamed polystyrene board having the aforesaid superior properties as thermal insulating materials by using a polystyrene having a low melt index and improving its extrusion processability by mixing the polystyrene with a flowability improver therefor and a blowing agent.

Other objects of this invention will become apparent from the detailed description of the invention which will follow.

According to this invention, these objects and advantages of the invention are achieved by an improved process for producing a foamed polystyrene board which comprises melting the polystyrene under heat in an extruder, mixing the molten mass with a blowing agent, and extruding the resulting foamable molten gel from the extruder into a lower pressure zone; the improvement being (1) that the polystyrene has a melt index, measured by the method described in ASTM D-1238G, of from 0.5 to 5, (2) that the blowing agent is a mixture of methyl chloride and dichlorodifluoromethane, and (3) that within the extruder, the polystyrene is mixed with a flowability improver for the polystyrene, said flowability improver having a melting point of more than 70° C.

DETAILED DESCRIPTION OF THE INVENTION

The polystyrene used in this invention includes homopolymers or copolymers such as polystyrene, high impact polystyrene, a copolymer of styrene and maleic anhydride, a copolymer of styrene and acrylonitrile, and a copolymer of styrene, butadiene and acrylonitrile (ABS resin). The proportion of the styrene monomer unit in the polymer or copolymer is at least 50 mole%, preferably at least 80 mole%.

Mixtures of the aforesaid homopolymers or copolymers with other vinyl polymers can also be used as the polystyrene in the present invention.

It is essential that the polystyrene used in this invention should have a melt index (MI), measured by the method set forth in ASTM D-1238G, of from 0.5 to 5. Use of these polystyrenes is important for increased mechanical strength of the resulting foam and for improved dimensional stability of the foam. Polystyrenes having a melt index of less than 0.5 have extremely poor flowability. Such polystyrene cannot satisfactorily be extrusion-formed even if there is used a specified flowability improver which has a melting point of more than 70° C. and which exhibits an action of improving the foamable molten gel containing the blowing agent.

Polystyrenes having a melt index of more than 5 have good flowability and good extrusion processability, but foam products produced therefrom have inferior mechanical strength and dimensional stability.

Generally, foams used as thermal insulating materials are required to have a well-balanced combination of mechanical strengths. For example, their compressive strength in the thickness direction, which is especially important under service conditions, should desirably be at least 2.0 kg/cm$^2$. Moreover, the dimensional stability of the product requires a fairly high degree of accuracy. For example, according to JIS A9511, the dimensional tolerances at room temperature for a foam having a width of 600 mm, a thickness of 25 mm and a length of 900 mm are within $-2$ to $+2$ mm in the widthwise direction, $-2$ to $+1$ mm in the thickness direction, and $-3$ to $+2$ mm in the lengthwise direction. When polystyrene having a melt index of more than 5 is used, it is extremely difficult to retain such a high mechanical strength with good balance, and foamed products must be aged for a fairly long period of time before they are finished into final products to meet fully with the requirement for the high accuracy of dimensional stability. Sometimes, dimensional variations exceeding the tolerable ranges occur during the aging process, and the products must be re-processed. Hence, the aforesaid polystyrenes are very disadvantageous for commercial application.

It is necessary therefore that the polystyrenes used in this invention should have a melt index of from 0.5 to 5. Those having a melt index of from 2 to 5 are preferred because they have especially superior extrusion formability, and lead to foamed polystyrene board having excellent mechanical strength and dimensional stability.

The flowability improver used in this invention has a melting point higher than 70° C. It is mixed with the polystyrene in the extruder to improve the flowability of the molten polystyrene having a low melt index.

The flowability improver in accordance with this invention permits the use of polystyrenes having a melt index of from 0.5 to 5 which have generally not been used heretofore in the production of foamed polystyrene board by extrusion.

If we use a compound having a melting point lower than 70° C. such as liquid paraffin, di-n-octyl phthalate or glycol stearate which are usually employed as plasticizers, we would be able to improve the flowability of the polystyrene, but with attendant degradation in the dimensional stability and mechanical strength of the resulting plate-like foams. In addition, the cell size of the foams would increase or the cell size would become non-uniform to deteriorate the thermal insulating properties of the foamed products, and the objects of the invention could not be achieved.

In contrast, the use of the flowability improver specified in this invention can lead to foamed polystyrene board having the superior properties described above, and thus to the achievement of the objects of the present invention.

The flowability improver used in this invention should have a melting point of more than 70° C. and should be able to be mixed in the molten state with the polystyrene. Examples of such a flowability improver include aromatic sulfonamides, brominated aromatic compounds, brominated alicyclic compounds, and poly($\alpha$-methylstyrene). More specifically, they include aromatic sulfonamides, for example lower alkyl-substituted benzenesulfonamides such as p-toluenesulfonamide, o-toluenesulfonamide and N-cyclohexyl p-toluenesulfonamide; brominated aromatic compounds such as pentabromoethylbenzene and 2,4,6-tribromophenyl-2-methyl-2,3-dibromopropyl ether; brominated alicyclic compounds such as pentabromocyclohexane, hexabromocyclohexane, tetrabromodichlorocyclohexane and hexabromocyclododecane; and poly($\alpha$-methylstyrene) (e.g., Amoco Resin 18-240, a registered trademark).

Of these, the brominated aromatic compounds and brominated alicyclic compounds are preferred, and hexabromocyclododecane and 2,4,6-tribromophenyl-2-methyl-2,3-dibromopropyl ether are especially preferred. These brominated compounds are superior in that they impart dimensional stability especially at elevated temperatures to the foamed polystyrene board obtained by this invention, and also impart a fire retarding effect to these products.

The above flowability improvers are used either singly or as mixtures of two or more. The preferred amount of the flowability improver is from 1 to 5 parts by weight per 100 parts by weight of the polystyrene. If its amount is smaller than 1 part, the flowability of the molten mass is not improved satisfactorily. On the other hand, if its amount is larger than 5 parts, it is difficult to feed polystyrene smoothly into the extruder.

The property of the flowability improver used in this invention is that the molten mass which comprises a mixture of 97 parts of the polystyrene and 3 parts of the flowability improver has a melt index, measured by the method set forth in ASTM D-1238G, of more than 5.

The process of this invention is performed by mixing the polystyrene and the flowability improver in an extruder, then mixing a blowing agent with the mixture, and extruding the resulting foamable molten gel from the extruder into a zone having a lower pressure than the pressure of the inside of the extruder.

In the process of this invention, the blowing agent used is a mixture of methyl chloride and dichlorodifluoromethane.

Our investigations have shown that when the mixture of methyl chloride and dichlorodifluoromethane is used as the blowing agent in the process of this invention, the methyl chloride further improves the flowability of the foamable molten gel in cooperation with the aforesaid flowability improver, and the dichlorodifluoromethane reduces the thermal conductivity of the resulting foam and thus improves the thermal insulation properties of the resulting product. We have further found that when a blowing agent of a novel composition composed of 65 to 85 mole% of methyl chloride and 35 to 15 mole% of dichlorodifluoromethane, is used in a novel combination of the aforesaid polystyrene having a specified melt index, and the specified flowability improver, an especially good advantage can be obtained.

Specifically, when the amount of methyl chloride in the blowing agent is at least 65 mole% (namely, the amount of the dichlorodifluoromethane is not more than 35 mole%), the mixing between the polystyrene and the blowing agent is effected thoroughly, and surging does not take place, and moreover, it exhibits a marked effect of improving the flowability and extrusion formability. When the amount of the methyl chloride is not more than 85 mole% (namely, the amount of the dichlorodifluoromethane is not less than 15 mole%), the shrinkage of the resulting foam is reduced and its dimensional stability is excellent, and moreover, the foam shows a thermal conductivity of not more than 0.030 Kcal/m.hr.°C. (at 0° C.).

Preferably, the blowing agent is used in this invention in an amount of 0.08 to 0.20 mole per 100 grams of the polystyrene. If it is less than 0.08 mole, the density of the resulting foam increases. When the amount exceeds 0.2 mole, the density of the foam is reduced extremely, or the cell sizes are increased or become non-uniform. The individual constituents of the blowing agent, either separately or mixed in advance, are fed into the extruder from the predetermined feed ports of the extruder in specified amounts.

In the process of this invention, the polystyrene is fed preferably in the form of pellets into an extruder such as a screw extruder, and melted under heat. The resulting molten mass is mixed with the blowing agent in a mixing zone while it gradually advances forward and finally reaches a cooling zone. Desirably, the flowability improver is mixed with the polystyrene prior to feeding into the extruder. If desired, it can be added to the molten mass within the extruder which may or may not contain the blowing agent.

The temperature at which the foamable molten gel is extruded from a die orifice in the process of this invention is a temperature within such a range that the foamable molten gel shows a melt viscosity suitable for foaming. Accordingly, the temperature varies depending upon the type of the polystyrene used, the type and amount of the flowability improver, the mixing ratio of the constituents of the blowing agent, or the amount of the blowing agent. Generally, the extrusion temperature is from 90° C. to 120° C. The pressure of the die orifice is generally from 50 to 140 kg/cm$^2$.

The foamable molten gel is extruded into the lower pressure zone through the die orifice, and is formed continuously into a foamed board having a definite cross-sectional area by being passed through a molding device generally called a guider.

In the process of this invention, a plurality of extruders may be used, connected in series. If desired, static mixers may be used together. Such a static mixer is disclosed, for example, in U.S. Pat. No. 3,751,377, and is sold on the market. When such a static mixer is used in the process of this invention, it can be provided between a plurality of extruders (e.g., two such extruders). Alternatively, the static mixer may be used just in front of the die orifice as stated in the above-cited U.S. Patent.

Scraps which occur at the time of shaving the foamed board obtained by extrusion can be re-used as raw material after crushing. The amount of such scraps is desirably up to about 30% by weight based on the starting polystyrene.

A cell size controlling agent may be added to the raw material. Examples of the cell size controlling agent are fine powders of inorganic compounds such as talc or clay; and combinations of carbonates or bicarbonates with compounds capable of decomposition or chemical change at elevated temperatures to generate gases, such as polycarboxylic acids or alkali metal salts thereof. Examples of the polycarboxylic acids or alkali metal salts thereof are tartaric acid, succinic acid, citric acid, oxalic acid, sodium hydrogen tartrate, potassium hydrogen succinate, sodium citrate, potassium citrate and sodium oxalate. Examples of the carbonates or bicarbonates are sodium carbonate, sodium bicarbonate, ammonium carbonate, ammonium bicarbonate, potassium carbonate and potassium bicarbonate. Among them, combinations of monoalkali metal citrates and carbonates or bicarbonates are preferred. The cell size controlling agent is used in an amount of usually 0.05 to 3 parts by weight per 100 parts by weight of the polystyrene. If desired, other additives such as coloring agents, heat stabilizers or fillers may be added in amounts which do not impair the intended objects of this invention.

The foamed products obtained by this invention have good dimensional stability, high mechanical strength, and superior thermal insulation properties at high temperatures of, for example, 70° C.

The foamed products obtained by this invention have a thickness of generally at least 15 mm, preferably about 20 mm to about 50 mm, although it is determined by the guider used.

Since the foamed products obtained by this invention have high dimensional stability, final finished products can be obtained from these products without the need for shaving which may cause large amounts of scraps, and also for the long-term aging process. These practical advantages are valuable in commercial application.

The following Examples and Comparative Examples illustrate the present invention in more detail. All parts in these examples are by weight.

EXAMPLE 1

One hundred parts of polystyrene having a melt index of 1.0, 3 parts of hexabromocyclododecane and 0.1 part of a cell size controlling agent composed of an equimolar mixture of monosodium citrate and sodium bicarbonate were fed into an extruder having an inside screw diameter of 90 mm.

From an inlet port provided in the extruder, a blowing agent composed of 70 mole% of methyl chloride and 30 mole% of dichlorodifluoromethane was forced into the extruder in an amount of 0.15 mole per 100 g of the polystyrene.

The foamable molten gel uniformly kneaded within the extruder was extruded at 110° C. into the atmosphere through a die orifice, 200 mm in width and 6 mm in clearance, provided at the exit of the extruder, and foamed. The foam was passed through a guider attached to the extruder to obtain a foamed polystyrene board having a sectional size of 620 mm × 28 mm.

The foamed product was cut into pieces with a cross-sectional size of 600 mm × 25 mm and a length of 900 mm, and machined to form test pieces.

The extrusion formability is shown in Table 1.

The mechanical properties, dimensional stability, dimensional stability under heat, and thermal conductivity of the test pieces were measured, and the results are shown in Table 2.

Tables 1 and 2 also summarize the results of the following Examples and Comparative Examples.

EXAMPLE 2

Example 1 was repeated except that polystyrene having a melt index of 2.5 was used.

EXAMPLE 3

Example 1 was repeated except that polystyrene having a melt index of 4.5 was used.

EXAMPLE 4

Example 1 was repeated except that 4 parts of 2,4,6-tribromophenyl-2-methyl-2,3-dibromopropyl ether was used instead of 3 parts of hexabromocyclododecane.

EXAMPLE 5

Example 1 was repeated except that polystyrene having a melt index of 2.5 and a blowing agent consisting of 75 mole% of methyl chloride and 25 mole% of dichlorodifluoromethane were used.

EXAMPLE 6

Example 1 was repeated except that polystyrene having a melt index of 2.5, and 0.11 mole, per 100 g of the polystyrene, of a blowing agent consisting of 80 mole% of methyl chloride and 20 mole% of dichlorodifluoromethane were used.

EXAMPLE 7

Example 1 was repeated except that polystyrene having a melt index of 4.5 was used and p-toluenesulfonamide was used instead of the hexabromocyclododecane.

COMPARATIVE EXAMPLE 1

Example 1 was repeated except that polystyrene having a melt index of 0.3 was used.

COMPARATIVE EXAMPLE 2

Example 1 was repeated except that polystyrene having a melt index of 8.0 was used.

COMPARATIVE EXAMPLE 3

Example 2 was repeated except that liquid paraffin was used instead of the hexabromocyclododecane.

COMPARATIVE EXAMPLE 4

Example 2 was repeated except that di-n-octyl phthalate was used instead of the hexabromocyclododecane.

COMPARATIVE EXAMPLE 5

Example 1 was repeated except that the hexabromocyclododecane was not used.

TABLE 1

| Example (Ex.) or Comparative Example (CEx.) | Melt index of the resin (*1) | Flowability improver Compound | Flowability improver Melting point (°C.) | Flowability improver Amount (parts) | Melt index after addition of the flowability improver (*2) | Blowing Agent Methyl chloride (mole %) | Blowing Agent Dichlorodifluoromethane (mole %) | Extrusion Amount (moles) | formability |
|---|---|---|---|---|---|---|---|---|---|
| Ex. 1 | 1.0 | Hexabromocyclododecane | 175 | 3.0 | 5.2 | 70 | 30 | 0.15 | Good |
| Ex. 2 | 2.5 | " | 175 | 3.0 | 6.0 | 70 | 30 | 0.15 | Good |
| Ex. 3 | 4.5 | " | 175 | 2.0 | 7.5 | 70 | 30 | 0.15 | Good |
| Ex. 4 | 1.0 | 2,4,6-Tribromophenyl-2-methyl-2,3-dibromopropyl ether | 78 | 4.0 | 6.0 | 70 | 30 | 0.15 | Good |
| Ex. 5 | 2.5 | Hexbromocyclododecane | 175 | 3.0 | 6.0 | 75 | 25 | 0.15 | Good |
| Ex. 6 | 2.5 | " | 175 | 3.0 | 6.0 | 80 | 20 | 0.11 | Good |
| Ex. 7 | 4.5 | p-Toluenesulfonamide | 105 | 3.0 | 8.0 | 70 | 30 | 0.15 | Good |
| CEx. 1 | 0.3 | Hexabromocyclododecane | 175 | 3.0 | 3.8 | 70 | 30 | 0.15 | Poor (operation impossible) |
| CEx. 2 | 8.0 | " | 175 | 3.0 | 15.0 | 70 | 30 | 0.15 | Good |
| CEx. 3 | 2.5 | Liquid paraffin | −20 | 3.0 | 8.0 | 70 | 30 | 0.15 | Good |
| CEx. 4 | 2.5 | Di-n-octyl phthalate | −25 | 3.0 | 6.0 | 70 | 30 | 0.15 | Good |
| CEx. 5 | 4.5 | None | — | — | 4.5 | 70 | 30 | 0.15 | Poor (operation impossible) |

TABLE 2

| Example (Ex.) or Comparative Example (CEx.) | Density (g/cm³) | Properties (*3) Compressive strength (kg/cm²) (*) | Properties (*3) Average cell diameter (mm) | Properties (*3) Thermal conductivity (K cal/m. hr. °C.) (**) | Dimensional changes (*4) 20° C. × 72 hours Length (mm) | Dimensional changes (*4) 20° C. × 72 hours Width (mm) | Dimensional changes (*4) 20° C. × 72 hours Thickness (mm) | Dimensional changes after heating (*5) 70° C. × 24 hours Length (mm) | Dimensional changes after heating (*5) 70° C. × 24 hours Width (mm) | Dimensional changes after heating (*5) 70° C. × 24 hours Thickness (mm) |
|---|---|---|---|---|---|---|---|---|---|---|
| Ex. 1 | 0.030 | 3.0 | 0.3 | 0.026 | −0.5 | −0.3 | 0 | −1.0 | −1.0 | 0 |
| Ex. 2 | 0.030 | 2.8 | 0.3 | 0.026 | −1.5 | −1.2 | 0 | −3.0 | −2.0 | 0 |
| Ex. 3 | 0.030 | 2.7 | 0.3 | 0.026 | −2.0 | −2.0 | −0.1 | −5.0 | −4.0 | −0.2 |
| Ex. 4 | 0.030 | 3.0 | 0.3 | 0.026 | −0.5 | −0.3 | 0 | −1.0 | −1.0 | — |
| Ex. 5 | 0.030 | 2.8 | 0.4 | 0.028 | −1.7 | −1.5 | −0.1 | −3.0 | −3.0 | −0.2 |
| Ex. 6 | 0.042 | 2.8 | 0.3 | 0.029 | −1.9 | −1.7 | −0.1 | −4.0 | −4.0 | −0.2 |
| Ex. 7 | 0.030 | 2.6 | 0.3 | 0.027 | −2.0 | −1.7 | −0.1 | −4.0 | −4.0 | −0.2 |
| CEx. 2 | 0.029 | 1.5 | 0.5 | 0.031 | −3.5 | −3.5 | −0.5 | −2.0 | −18 | −1.9 |
| CEx. 3 | 0.029 | 1.2 | 0.9 | 0.035 | −2.5 | −2.4 | −0.3 | −15 | −13 | −1.0 |

TABLE 2-continued

| Example (Ex.) or Comparative Example (CEx.) | Properties (*3) | | | | Dimensional changes (*4) 20° C. × 72 hours | | | Dimensional changes after heating (*5) 70° C. × 24 hours | | |
| --- | --- | --- | --- | --- | --- | --- | --- | --- | --- | --- |
| | Density (g/cm$^3$) | Compressive strength (kg/cm$^2$) (*) | Average cell diameter (mm) | Thermal conductivity (K cal/m. hr. °C. (**) | Length (mm) | Width (mm) | Thickness (mm) | Length (mm) | Width (mm) | Thickness (mm) |
| CEx. 4 | 0.030 | 1.2 | 1.0 | 0.035 | −2.5 | −2.4 | −0.3 | −15 | −12 | −1.0 |

(*1): Measured in accordance with ASTM D-1238G.
(*2): After mixing, the mixture was cooled and pelletized, and then its melt index was measured in the same way as in (*1).
(*3): Measured after standing for 72 hours at 20° C. subsequent to extrusion forming
(*) Strength in the thickness direction.
(**) Measured at 0° C. in accordance with ASTM C-11.
(*4): Variations of the dimensions after standing for 72 hours at 20° C. subsequent to extrusion forming, from the original dimensions (−represents shrinkage; + represents elongation)
(*5): Variations of the dimensions after standing for 72 hours at 20° C. and then heating in an oven at 70° C. (− and + symbols have the same meanings as above).

What we claim is:

1. In a process for producing a foamed polystyrene board which comprises melting the polystyrene under heat in an extruder, mixing the molten mass with a blowing agent, and extruding the resulting foamable molten gel from the extruder into a lower pressure zone; the improvement wherein
   (1) the polystyrene has a melt index, measured by the method set forth in ASTM D-1238G, of from 0.5 to 5,
   (2) the blowing agent is a mixture of 65 to 85 mole% of methyl chloride and 35 to 15 mole% of dichlorodifluoromethane, and
   (3) within the extruder, the polystyrene is mixed with a flowability improver for the polystyrene in an amount of from 1 to 5 parts by weight of the flowability improver per 100 parts by weight of the polystyrene, said flowability improver having a melting point of more than 70° C.

2. The process of claim 1 wherein the blowing agent is used in an amount of 0.08 to 0.20 mole per 100 g of the polystyrene.

3. The process of claim 1 wherein the melt index of the polystyrene is from 2 to 5.

4. The process of claim 1 wherein the flowability improver is at least one member of the group consisting of aromatic sulfonamides, brominated aromatic compounds, brominated alicyclic compounds and poly(α-methylstyrene).

5. The process of claim 4 wherein the aromatic sulfonamides are lower alkyl-substituted benzenesulfonamides.

6. The process of claim 5 wherein the alkyl substituted benzenesulfonamide is p-toluenesulfonamide, o-toluenesulfonamide or N-cyclohexyl p-toluenesulfonamide.

7. The process of claim 4 wherein the brominated aromatic compound is pentabromoethylbenzene or 2,4,6-tribromophenyl-2-methyl-2,3-dibromopropyl ether.

8. The process of claim 4 wherein the brominated alicyclic compound is pentabromochlorocyclohexane, hexabromocyclohexane, tetrabromodichlorocyclohexane or hexabromocyclododecane.

* * * * *